(12) United States Patent
Shimamura

(10) Patent No.: US 12,307,430 B2
(45) Date of Patent: May 20, 2025

(54) TRAVELING BODY, PAYMENT MANAGEMENT SYSTEM, AND VEHICLE

(71) Applicant: HONDA MOTOR CO., LTD., Tokyo (JP)

(72) Inventor: Hideaki Shimamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 433 days.

(21) Appl. No.: 17/824,335

(22) Filed: May 25, 2022

(65) Prior Publication Data

US 2022/0292592 A1 Sep. 15, 2022

Related U.S. Application Data

(63) Continuation of application No. PCT/JP2019/047906, filed on Dec. 6, 2019.

(51) Int. Cl.
| | |
|---|---|
| *G06Q 20/14* | (2012.01) |
| *B60L 53/10* | (2019.01) |
| *B60L 53/66* | (2019.01) |
| *G05D 1/00* | (2006.01) |
| *G07B 15/02* | (2011.01) |

(52) U.S. Cl.
CPC ............ *G06Q 20/145* (2013.01); *B60L 53/10* (2019.02); *B60L 53/665* (2019.02); *G05D 1/0212* (2013.01); *G07B 15/02* (2013.01)

(58) Field of Classification Search
CPC ...... G06Q 20/145; B60L 53/665; G07B 15/02
USPC ............................................. 235/33
See application file for complete search history.

(56) References Cited

U.S. PATENT DOCUMENTS

| | | | | |
|---|---|---|---|---|
| 2015/0346727 A1* | 12/2015 | Ramanujam | ....... | B62D 15/0285 701/23 |
| 2018/0011483 A1* | 1/2018 | Ricci | ...................... | G06Q 10/20 |

FOREIGN PATENT DOCUMENTS

| | | |
|---|---|---|
| JP | 2006-227673 A | 8/2006 |
| JP | 2009-271631 A | 11/2009 |
| JP | 2015-175288 A | 10/2015 |
| WO | 2019/180855 A1 | 9/2019 |

OTHER PUBLICATIONS

International Search Report dated Mar. 10, 2020, issued in counterpart International Application No. PCT/JP2019/047906, with English Translation. (5 pages).

* cited by examiner

*Primary Examiner* — Toan C Ly
(74) *Attorney, Agent, or Firm* — WHDA, LLP

(57) ABSTRACT

A traveling body is provided. A reception unit receives first information regarding a state of payment related to use of the traveling body from a payment management server that manages the state of payment. A traveling mechanism is driven under control of a control unit capable of limiting traveling of the traveling body according to the state of payment. A transmission unit transmits second information based on the first information to the control unit.

13 Claims, 7 Drawing Sheets

TRAVELING BODY, PAYMENT MANAGEMENT SYSTEM, AND VEHICLE

CROSS-REFERENCE TO RELATED APPLICATION(S)

This application claims priority to and the benefit of International Patent Application No. PCT/JP2019/047906 filed on Dec. 6, 2019, the entire disclosures of which is incorporated herein by reference.

BACKGROUND OF THE INVENTION

Field of the Invention

The present invention relates to a traveling body, a payment management system, and a vehicle.

Description of the Related Art

A self-propelled traveling body is known (Japanese Patent Laid-Open No. 2006-227673). It is conceivable that transport work is performed by a transport vehicle using such a traveling body, or predetermined work is performed by a work vehicle having a work machine mounted on the traveling body.

SUMMARY OF THE INVENTION

According to an embodiment of the present invention, a traveling body is comprising:
  a reception unit that receives first information regarding a state of payment related to use of the traveling body from a payment management server that manages the state of payment;
  a traveling mechanism that is driven under control of a control unit capable of limiting traveling of the traveling body according to the state of payment; and
  a transmission unit that transmits second information based on the first information to the control unit.

According to another embodiment of the present invention, a payment management system comprises:
  a traveling body; and
  a payment management server that manages a state of payment related to use of the traveling body, wherein
  the traveling body includes:
  a reception unit that receives first information regarding the state of payment from the payment management server;
  a traveling mechanism that is driven under control of a control unit capable of limiting traveling of the traveling body according to the state of payment; and
  a transmission unit that transmits second information based on the first information to the control unit.

According to yet another embodiment of the present invention, a vehicle comprises:
  a traveling body; and
  a control unit capable of limiting traveling of the traveling body, wherein
  the traveling body includes:
  a reception unit that receives first information regarding a state of payment related to use of the traveling body from a payment management server that manages the state of payment;
  a traveling mechanism that is driven under control of a control unit capable of limiting traveling of the traveling body according to the state of payment; and
  a transmission unit that transmits second information based on the first information to the control unit, and
  the control unit limits traveling of the traveling body on the basis of the second information.

DESCRIPTION OF THE EMBODIMENTS

Figure 1:
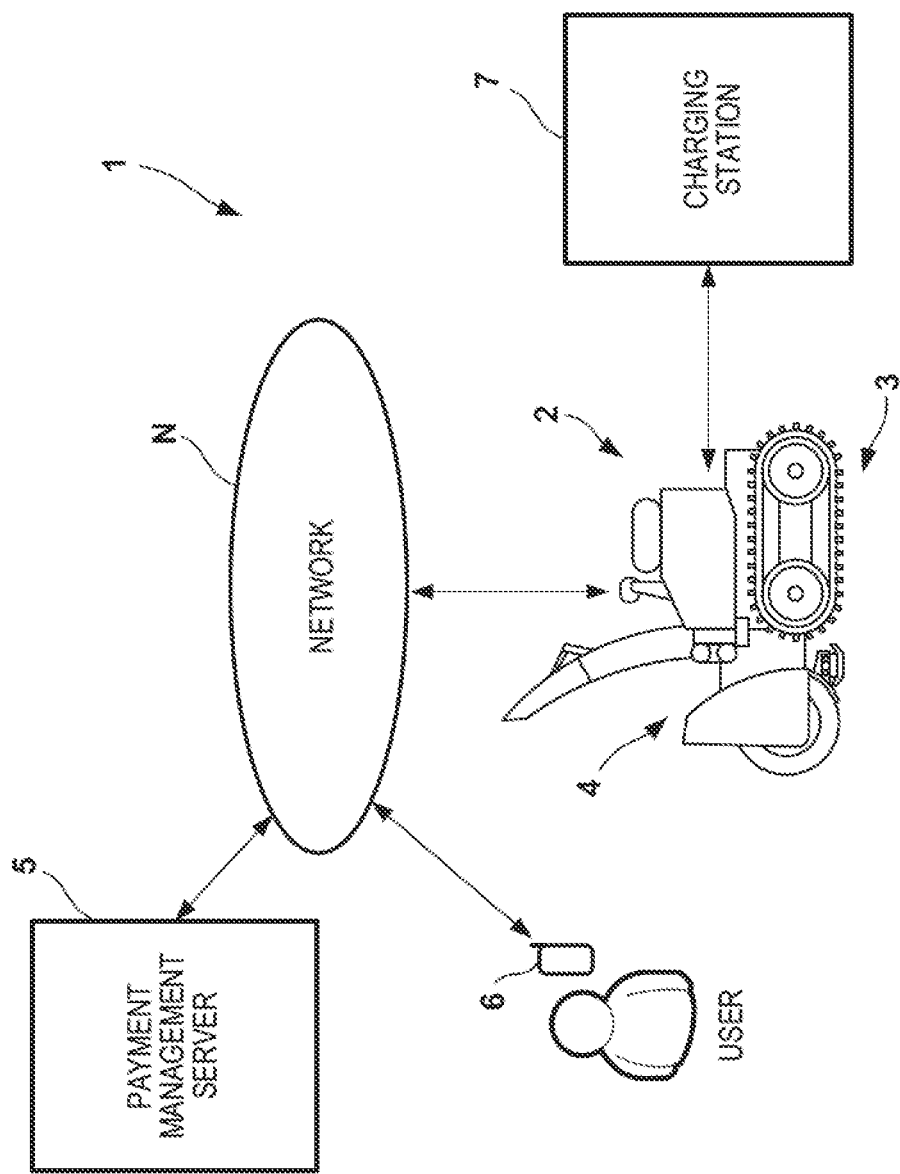
FIG. 1 is a diagram illustrating a configuration example of a payment management system according to an embodiment.

In a case where a service for providing the transport vehicle or the work vehicle described above is performed, it is conceivable that a service provider limits driving of the traveling body according to the state of payment of the user. In addition, from the viewpoint of entering such a business, it is desirable that the service provider can more easily restrict driving of the traveling body.

An embodiment of the present invention provides a technique capable of more easily limiting driving of a traveling body according to the state of payment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<System Configuration>

FIG. 1 is a diagram illustrating an example of a configuration of a payment management system 1 (system 1) according to an embodiment.

The system 1 is a system for managing the state of payment related to use of a traveling body 3 or a vehicle 2 including the traveling body 3. The system 1 is used for, for example, a service (hereinafter referred to as vehicle use service) in which the vehicle 2 can be used by paying a predetermined amount. In addition, the system 1 limits the function of the vehicle 2 according to the state of payment. In the present embodiment, the system 1 includes the vehicle 2, a payment management server 5, a terminal 6 of a user of the vehicle 2, and a charging station 7. The payment management server 5 can communicate with the vehicle 2 and the terminal 6 via a network N.

The vehicle 2 includes the traveling body 3 for traveling on its own and a functional section 4 that exhibits a predetermined function. In the present embodiment, the functional section 4 performs autonomous control of the traveling body 3 and work by a work unit 42.

The payment management server 5 (server 5) manages the state of payment related to use of the traveling body 3 or the vehicle 2. For example, the server 5 can be installed in an office of a provider of the traveling body 3, an office of a management company that provides the vehicle use service, or the like. The terminal 6 is, for example, a mobile terminal such as a smartphone or an information processing terminal such as a PC owned by a user A who uses the vehicle 2. The charging station 7 is a station for charging a battery 33 (FIG. 3) mounted on the vehicle 2. As an example, the charging station 7 includes a transmitter that transmits a signal receivable by the vehicle 2, and the vehicle 2 returns to the charging station 7 according to the signal transmitted from the transmitter.

<Hardware Configuration>

Figure 2:
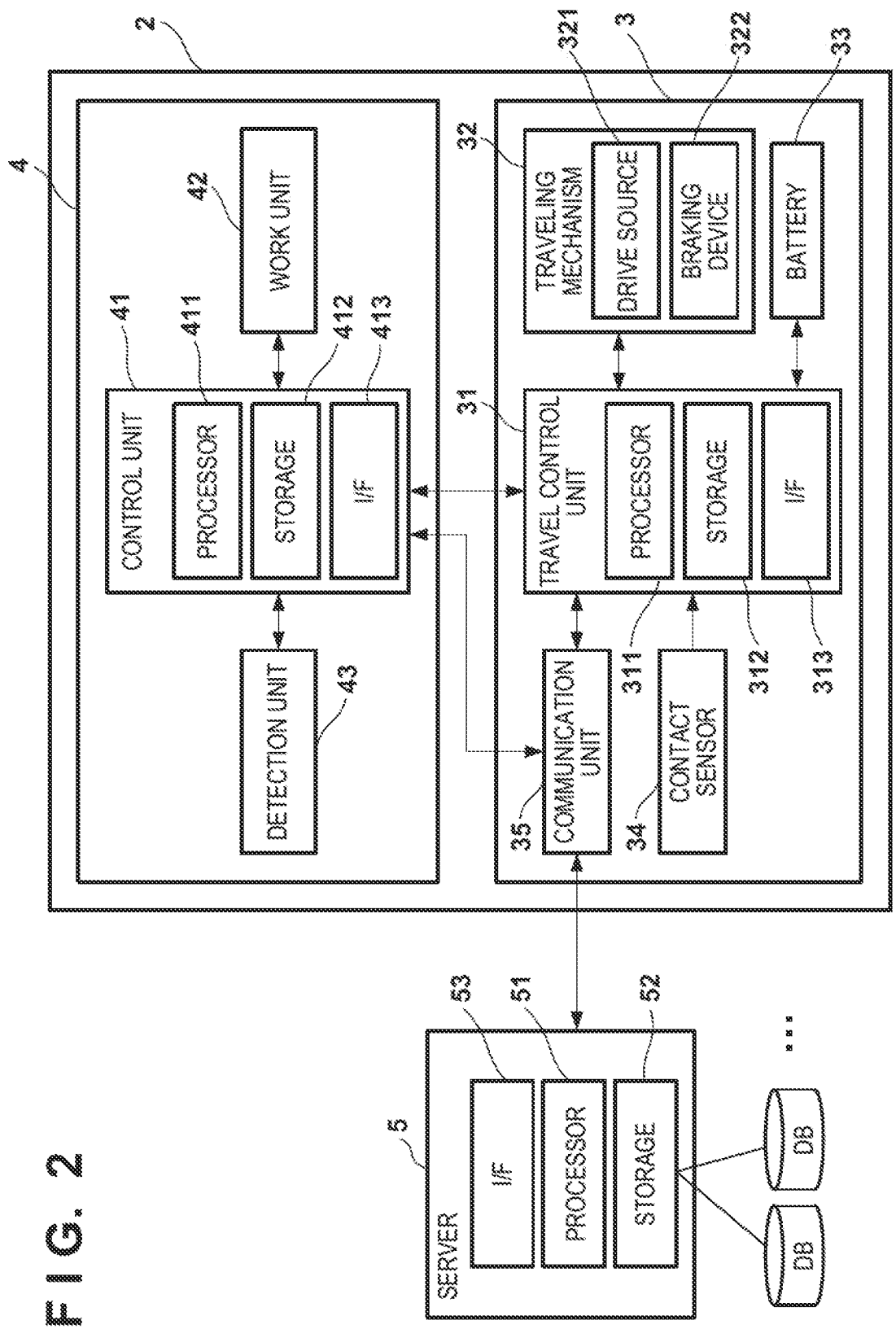
FIG. 2 is a diagram illustrating an example of a hardware configuration of a vehicle and a server according to the embodiment.

FIG. 2 is a diagram illustrating an example of a hardware configuration of the vehicle 2 and the server 5 according to the embodiment. The vehicle 2 includes the traveling body 3 and the functional section 4.

The traveling body 3 includes a travel control unit 31, a traveling mechanism 32, a battery 33, a contact sensor 34, and a communication unit 35.

The travel control unit 31 is a unit that controls traveling by the traveling mechanism 32, and is, for example, an electronic control unit (ECU). The travel control unit 31 includes a processor 311, a storage 312 such as a RAM and a ROM, and an I/F 313 (interface) that relays transmission and reception of signals between an external device and the processor 311.

The processor 311 is a processor represented by a CPU, and executes a program stored in the storage 312. In the present embodiment, the processor 311 controls the traveling mechanism 32 including a drive source 321 and a braking device 322 to cause the traveling body 3 to travel. The travel control unit 31 can communicate with a control unit 41 to be described later, and can control the traveling mechanism 32 on the basis of an instruction from the control unit 41. The storage 312 stores data and the like used by the processor 311 for processing, in addition to the program executed by the processor 311.

The traveling mechanism 32 includes the drive source 321 and the braking device 322. In the present embodiment, the traveling mechanism 32 includes an electric motor as the drive source 321. However, it is also possible to adopt a configuration in which the traveling mechanism 32 includes an engine as the drive source 321 or a configuration in which the drive source 321 includes both an electric motor and an engine. In addition, the traveling mechanism 32 may include an engine for power generation, and may be driven by an electric motor as the drive source 321 using electric power generated by the engine. The braking device 322 brakes a drive wheel driven by the drive source 321.

The battery 33 supplies electric power to the electric motor. As the battery 33, for example, a rechargeable secondary battery such as a lead storage battery, a lithium-ion battery, or a nickel-hydrogen battery is used.

The contact sensor 34 is a sensor capable of detecting contact with obstacles around the traveling body 3. Examples of the contact sensor 34 include an acceleration sensor that detects an impact at the time of contact.

The communication unit 35 is a unit capable of wirelessly communicating with the server 5, and receives information regarding the state of payment from the server 5. Information regarding the state of payment may be, for example, an amount of payment made by the user to use the vehicle 2 or the traveling body 3, or a balance obtained by subtracting the usage fee from the amount of payment. Furthermore, for example, information regarding the state of payment may be information regarding whether payment for a target month is completed.

The traveling body 3 transmits information based on the information received from the server 5 to the control unit 41. For example, the communication unit 35 may receive information of the amount of payment from the server 5 and transmit the information of the amount of payment to the control unit 41. Furthermore, for example, the travel control unit 31 may receive information received by the communication unit 35 from the server 5 from the communication unit 35, and transmit a request signal for switching a traveling mode (see FIG. 6) of the traveling body 3 to the control unit 41 on the basis of the information.

While the travel control unit 31 and the communication unit 35 are provided separately in the present embodiment, it is also possible to adopt a configuration in which these components are provided integrally.

The functional section 4 can be mounted on the traveling body 3 and exhibits a predetermined function. In the present embodiment, the functional section 4 includes the control unit 41, the work unit 42, and a detection unit 43.

The control unit 41 is a unit that controls the traveling body 3 and the work unit 42, and is, for example, an electronic control unit (ECU). The control unit 41 includes a processor 411, a storage 412 such as a RAM and a ROM, and an I/F 413 (interface) that relays transmission and reception of signals between an external device and the processor 411.

The processor 411 is a processor represented by a CPU, and executes a program stored in the storage 412. The storage 412 stores data and the like used by the processor 411 for processing, in addition to the program executed by the processor 411.

In the present embodiment, the processor 411 can limit traveling of the traveling body 3 according to the state of payment. For example, the processor 411 limits traveling of the traveling body 3 on the basis of information received from the communication unit 35 or the travel control unit 31. In addition, the processor 411 performs autonomous traveling control of the traveling body 3 on the basis of the detection result of the detection unit 43. In addition, the processor 411 controls the work unit 42.

The work unit 42 is a unit that is mounted on the traveling body 3 and performs predetermined work under the control of the control unit 41. In the present embodiment, the work unit 42 performs snow removal work. That is, in the present embodiment, the vehicle 2 is a self-propelled snow removing work machine. Other examples of the work unit 42 include a lawn mower, a cultivator, other agricultural machines, and a construction machine. The work unit 42 may be configured to be detachable from the traveling body 3 with an arbitrary attachment mechanism interposed therebetween, and may be replaced with various types of work units by the user according to the purpose.

Note that in the present embodiment, examples of the function exhibited by the functional section 4 include autonomous traveling control of the traveling body 3, traveling limit, and predetermined work by the work unit 42. However, it is also possible to adopt a configuration in which the functional section 4 does not include the work unit 42 and limits traveling of the traveling body 3 by the control unit 41, so that the vehicle 2 functions as a transport vehicle. In addition, while the control unit 41 limits traveling of the traveling body 3 that travels autonomously in the present embodiment, it is also possible to adopt a configuration in which the control unit 41 limits traveling of the traveling body 3 in a configuration in which the user can operate the traveling body 3. Note that in a case where the traveling body 3 is used as a transport vehicle, a unit that performs a part of the transportation work, such as an actuator for tilting a cargo bed or an elevator for lifting and lowering cargo at the time of loading and unloading, may be provided as the work unit 42.

The detection unit 43 is used for autonomous traveling control of the traveling body 3 by the control unit 41. The detection unit 43 is, for example, a camera, a GPS, a millimeter wave radar, a light detection and ranging (LiDAR), or the like. The control unit 41 performs autonomous traveling control of the traveling body 3 on the basis of the detection result of the detection unit 43.

The server 5 is a server for managing the state of payment of a service user (user). The server 5 includes a processor 51, a storage 52 such as a RAM and a ROM, and an I/F 53 (interface) that relays transmission and reception of signals between an external device and the processor 51.

The processor 51 is a processor represented by a CPU, and executes a program stored in the storage 52. For example, the processor 51 can communicate with the terminal 6 via the network N by the I/F 53, and store information regarding the state of payment of the vehicle 2 in the storage 52 or read the information from the storage 52. In addition, the processor 51 can communicate with the communication unit 35 of the vehicle 2 via the network N by the I/F 53 and transmit information regarding the state of payment of the vehicle 2 to the communication unit 35.

The storage 52 stores data and the like used by the processor 51 for processing, in addition to the program executed by the processor 51. In addition, the storage 52 may be distributed on a cloud. In the storage 52, information of the vehicle 2 and information regarding the state of payment of the user of the vehicle 2 are associated with each other, and a database DB for the vehicle 2 and the user of the vehicle 2 is constructed.

<Operation Mode of System>

Figure 3:
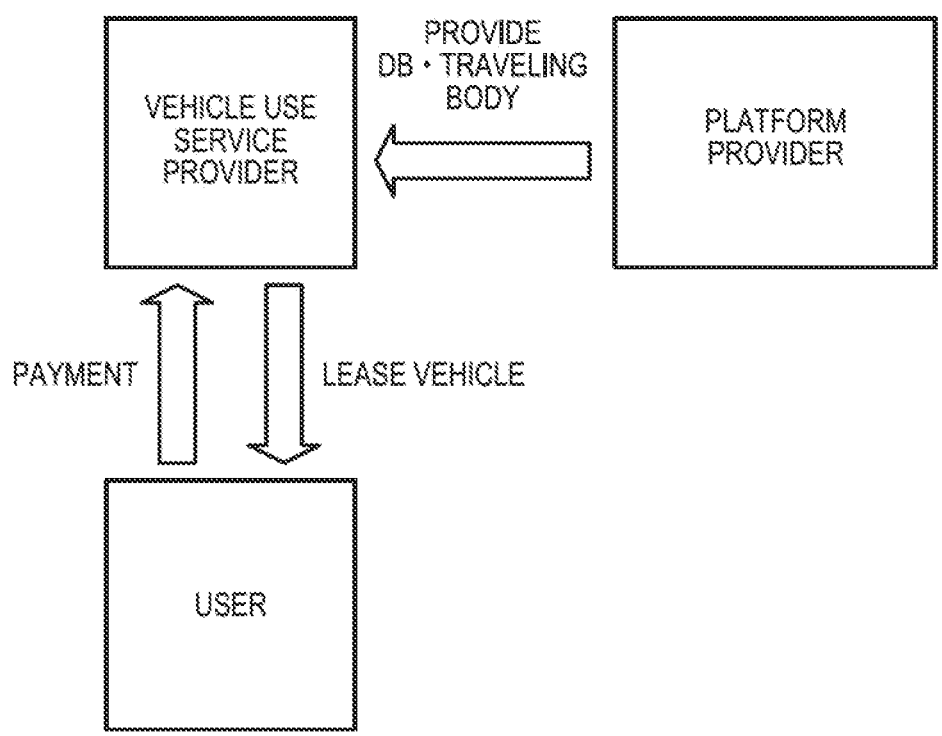
FIG. 3 is a diagram illustrating an example of an operation mode of the system illustrated in FIG. 1.

FIG. 3 is a diagram illustrating an example of an operation mode of the system 1 illustrated in FIG. 1. A platform provider provides the traveling body 3 provided with the communication unit 35 and the DB constructed in the server 5 to a vehicle use service provider (service provider). For example, the platform provider leases or sells the traveling body 3 to the service provider.

The service provider leases the vehicle 2 in which the functional section 4 is mounted on the traveling body 3 as a completed vehicle to a user. The user pays the usage fee of the vehicle to the service provider. For example, the user installs an application for making the payment on his/her terminal 6, and makes the payment using the application. The service provider uses the DB to acquire the state of payment of the user, and limits the function of the vehicle 2 according to the state of payment. For example, the service provider may limit driving of travel by the traveling body 3 and predetermined work by the work unit 42 when there is no payment by the user.

In the example of the operation mode of FIG. 3, the service provider does not need to construct a DB for developing the traveling body 3 and managing payment, and can provide a service by developing the functional section 4. Furthermore, since the traveling body 3 provided by the platform provider includes the communication unit 35 for communicating with the server 5, the functional section 4 developed by the service provider does not require a configuration capable of communicating with the server 5. Therefore, the service provider can easily join the vehicle use service business where it is possible to limit use according to the state of payment. Note that the above-described operation mode is an example, and other modes can be adopted.

<Processing Example of Limit on Vehicle Function>

Figure 4:
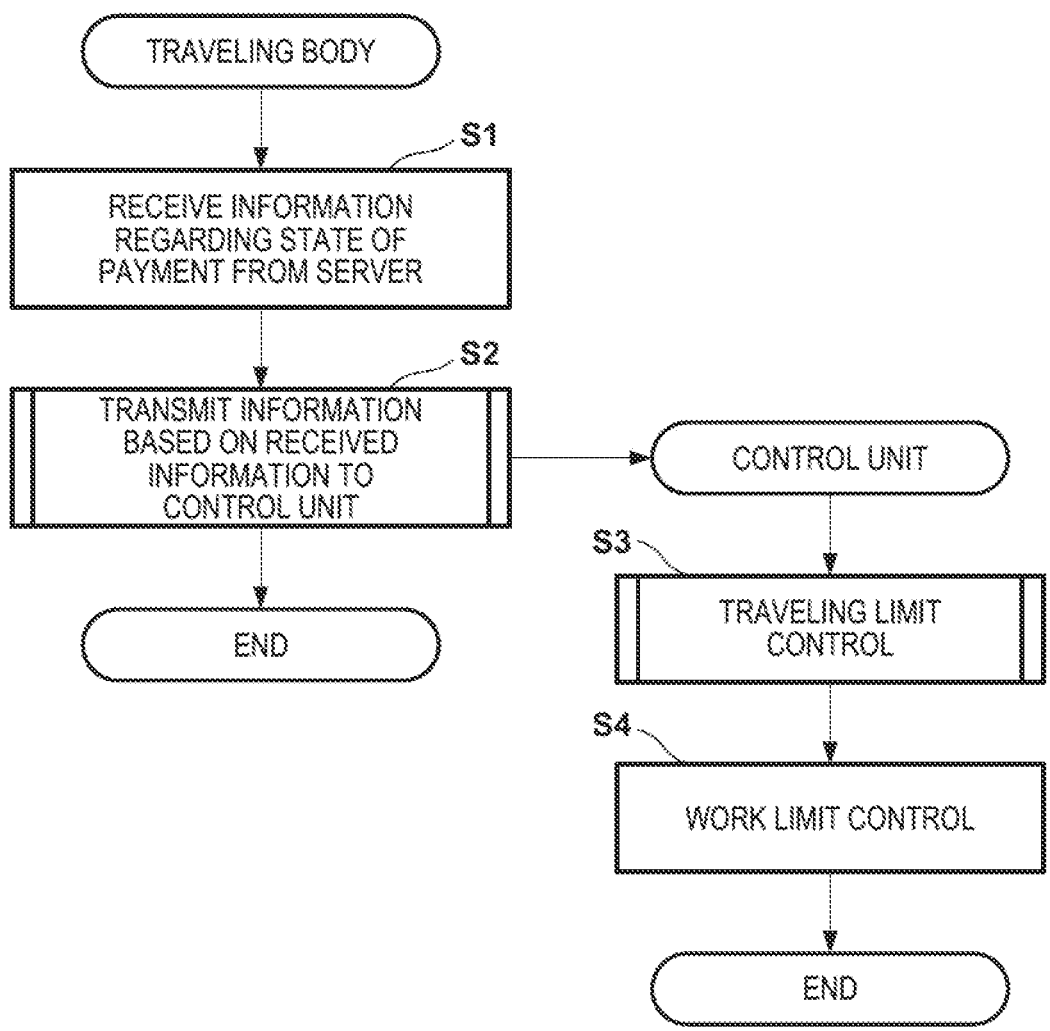
FIG. 4 is a flowchart illustrating a processing example of a traveling body and a control unit of the vehicle.

FIG. 4 is a flowchart illustrating a processing example of the traveling body 3 and the control unit 41 of the vehicle 2. This flowchart illustrates a processing example when the function of the vehicle 2 is limited according to the state of payment. For example, this flowchart is executed for each payment cycle (e.g., each month). In addition, for example, this flowchart may be executed when the payment information on the DB is updated, when the power of the vehicle is turned on, or the like.

In S1, the communication unit 35 of the traveling body 3 receives information regarding the state of payment from the server. Information regarding the state of payment may be, for example, an amount of payment made by the user for using the vehicle 2 or the traveling body 3 or a balance obtained by subtracting a usage fee from the amount of payment. Furthermore, for example, information regarding the state of payment may be information regarding whether payment for a target month is completed.

In S2, the traveling body 3 transmits information based on the information received in S1 to the control unit 41. Note that the communication unit 35 may transmit information to the control unit 41 (see FIG. 5), or the travel control unit 31 may transmit information to the control unit 41 (see FIG. 6). In addition, the information transmitted from the traveling body 3 to the control unit 41 may be the same as the information received by the communication unit 35 from the server 5, or may be different information based on the information received from the server 5.

In S3, the processor 411 of the control unit 41 performs traveling limit control of the traveling body 3 on the basis of the information received from the traveling body 3. Examples of the traveling limit include driving stop, speed restriction, and return to a predetermined position, such as the charging station 7, of the traveling body 3. In addition, for example, it is also possible to adopt a configuration in which the traveling body 3 has, as traveling modes, a normal mode and a limited mode in which driving is more limited than in the normal mode, and the processor 411 switches the traveling mode from the normal mode to the limited mode to limit traveling of the traveling body 3.

In S4, the processor 411 performs work limit control of the work unit 42 on the basis of the information received from the traveling body 3. As an example, the processor 411 stops the work by the work unit 42 when the amount of payment is insufficient. Note that the traveling limit control in S3 and the work limit control in S4 may be performed in parallel. For example, the processor 411 may stop the work of the work unit 42 while limiting the traveling speed of the traveling body 3 to a predetermined speed or less by the traveling limit control.

As described above, according to the present processing example, the processor 411 can limit the traveling of the traveling body 3 according to the state of payment without the functional section 4 having a configuration capable of communicating with the server 5 that manages the state of payment. In addition, the processor 411 can limit the work of the work unit 42 without the functional section 4 having a configuration capable of communicating with the server 5.

Figure 5:
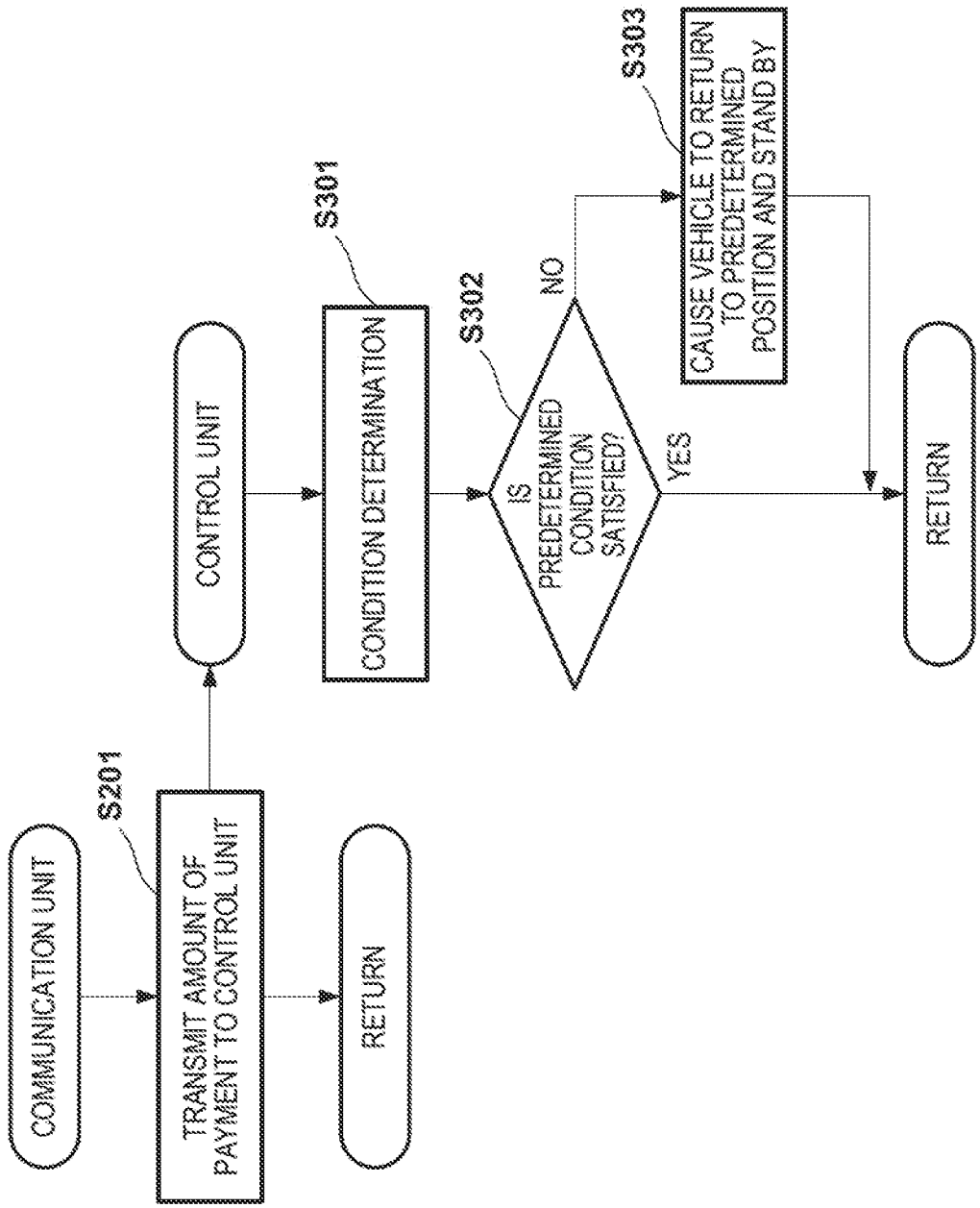
FIG. 5 is a flowchart illustrating a processing example of a communication unit and the control unit.

FIG. 5 is a flowchart illustrating a processing example of the communication unit 35 and the control unit 41. FIG. 5 is a flowchart illustrating subroutines of S2 and S3 in FIG. 4, and illustrates a processing example in a case where information is transmitted from the communication unit 35 to the control unit 41 in S2. In FIG. 5, S201 is the subroutine of S2, and S301 to S303 are the subroutine of S3.

In S201, the communication unit 35 transmits the amount of payment as information based on the state of payment received from the server 5 to the control unit 41, and ends the subroutine of S2. Note that the information transmitted from the communication unit 35 to the control unit 41 may be the balance obtained by subtracting the usage fee from the amount of payment. In addition, for example, the communication unit 35 may transmit the same information as the information received from the server 5 in S1 to the control unit 41 as itis.

In S301, the processor 411 of the control unit 41 performs condition determination as to whether the received amount of payment satisfies a predetermined condition. For example, the processor 411 determines whether a condition that the amount of payment is equal to or more than the usage fee in the target month is satisfied. In S302, the processor 411 ends the subroutine of S3 if the amount of payment satisfies the predetermined condition, and proceeds to S303 if the amount of payment does not satisfy the predetermined condition.

In S303, the processor 411 limits driving of the traveling body 3 by returning the vehicle 2 to a predetermined position and causing the vehicle 2 to stand by. In the present embodiment, the processor 411 causes the vehicle 2 to return to the charging station 7 and stand by. Thereafter, the processor 411 ends the subroutine of S3.

Note that the processor 411 may stop the work of the work unit 42 when returning the vehicle 2 to the predetermined position. As a result, the processor 411 can stop the work of the work unit 42 when the amount of payment is insufficient, for example.

As described above, according to the present processing example, since the vehicle is caused to return to the charging station 7 and stand by as the traveling limit of the traveling body 3, it is possible to prevent the operating vehicle 2 from stopping on the spot. In addition, since the vehicle stands by at the charging station 7, the battery 33 can be charged until the traveling limit is canceled. Note that in S303, the processor 411 causes the traveling body 3 to return to the charging station 7 as the predetermined position. However, the processor 411 may cause the traveling body 3 to stop at a parking space of the traveling body 3, a predetermined position outside the traveling area, or the like.

Figure 6:
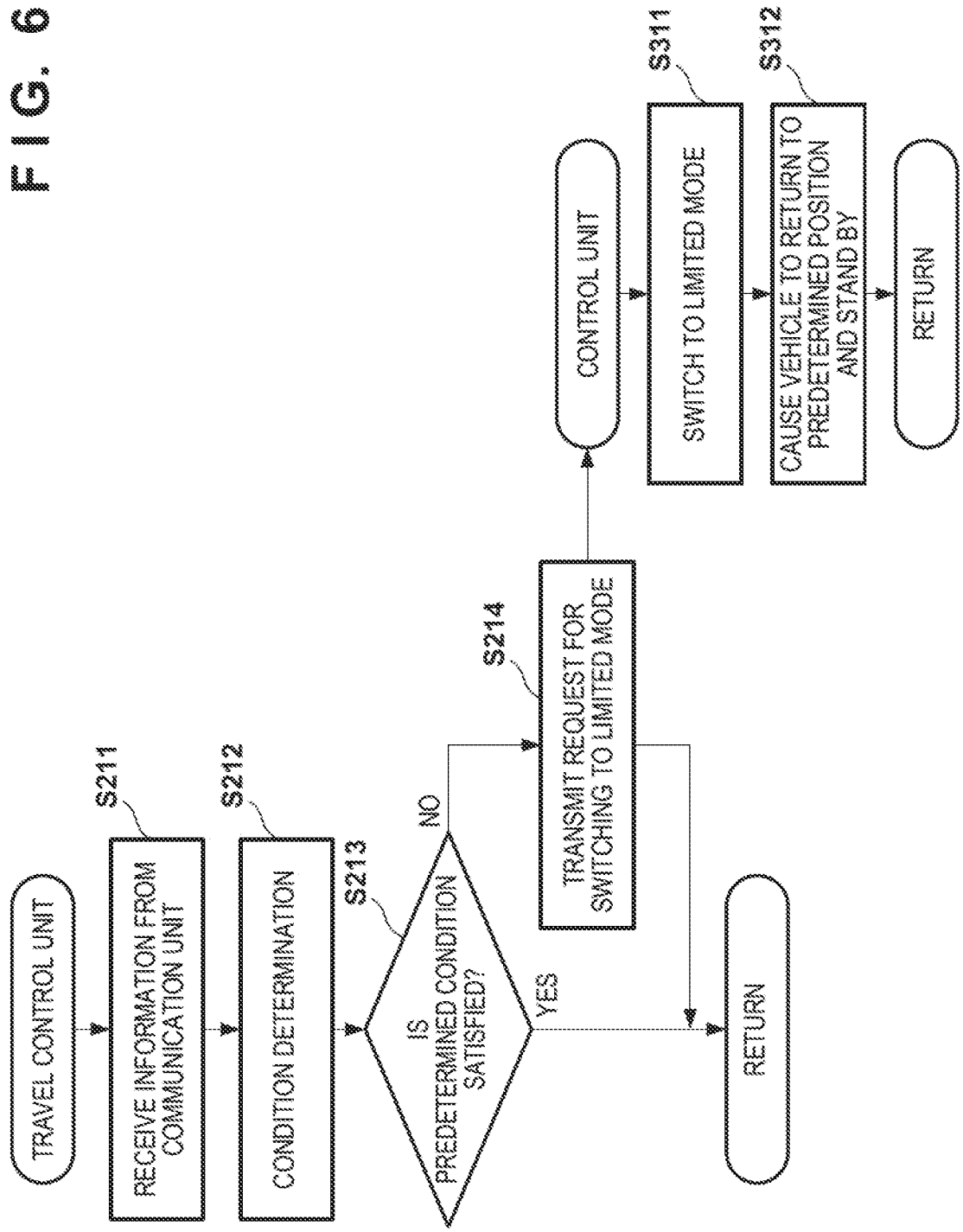
FIG. 6 is a flowchart illustrating a processing example of a travel control unit and the control unit.

FIG. 6 is a flowchart illustrating a processing example of the travel control unit 31 and the control unit 41. FIG. 6 is a flowchart illustrating subroutines of S2 and S3 in FIG. 4, and illustrates a processing example in a case where information is transmitted from the travel control unit 31 to the control unit 41 in S2. In FIG. 5, S211 to S214 are the subroutine of S2, and S311 to S312 are the subroutine of S3.

FIG. 6 illustrates a processing example in a case where the traveling body 3 has a plurality of traveling modes, and can travel in a so-called normal mode and in a limited mode in which driving is more limited than in the normal mode. The content of the limited mode can be set as appropriate. For example, the limited mode may be a mode in which only slow driving by the traveling body 3 can be performed. Note that the following describes a case where the traveling body 3 travels in the normal mode in an initial state.

In S211, the processor 311 of the travel control unit 31 receives the information received by the communication unit 35 from the server 5 from the communication unit 35. For example, the travel control unit 31 receives an amount of payment as information based on the state of payment from the communication unit 35.

In S212, the processor 311 performs condition determination as to whether the amount of payment satisfies a predetermined condition on the basis of the received information. For example, the processor 311 determines whether a condition that the amount of payment is equal to or more than the usage fee in the target month is satisfied. In S213, the processor 311 ends the subroutine of S2 if the amount of payment satisfies the predetermined condition, and proceeds to S214 if the amount of payment does not satisfy the predetermined condition.

In S214, regarding the traveling mode of the traveling body 3, the processor 311 transmits a request for switching to the limited mode, and ends the subroutine of S2. For example, when the current traveling mode is the normal mode, the processor 311 transmits, to the control unit 41, information for requesting switching from the normal mode to the limited mode.

In S311, the processor 411 switches the traveling mode of the traveling body 3 from the normal mode to the limited mode. In S312, the processor 411 causes the vehicle 2 to return to a predetermined position and stand by, and ends the subroutine.

As described above, in the present processing example, the processor 411 can switch the traveling mode on the basis of a switching request of the traveling mode from the traveling body 3.

In addition, also in the processing of FIG. 5, when the control unit 41 causes the vehicle 2 to return to a predetermined position, the control unit 41 may switch the traveling mode to the limited mode and cause the vehicle 2 to return.

When the processing of FIG. 5 is compared with the processing of FIG. 6, in the processing of FIG. 5, it can be said that the subject of determination as to whether to limit traveling of the traveling body 3 is on the functional section 4 side (control unit 41) in the processing of FIG. 5, and is on the traveling body 3 side (travel control unit 31) in the processing of FIG. 6. As described above, it is possible to adopt both configurations in which the subject of determination as to whether to perform the traveling limit is the traveling body 3 side and is the functional section 4 side.

<Processing Example of Usage Fee Determination Processing>

Figure 7:
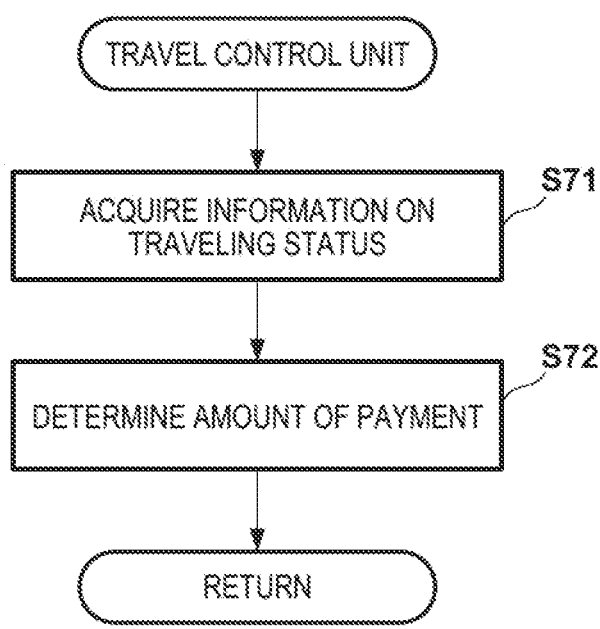
FIG. 7 is a flowchart illustrating a processing example of the travel control unit 31.

FIG. 7 is a flowchart illustrating a processing example of the travel control unit 31, and illustrates a processing example in a case where the usage fee is determined on the basis of the usage status of the vehicle 2. That is, FIG. 7 illustrates a processing example of the travel control unit 31 in a case where the usage fee for using the vehicle 2 is a metered rate system according to usage. For example, this flowchart is executed at a timing when the usage fee is determined for each payment cycle (e.g., every month).

In S71, the processor 311 of the travel control unit 31 acquires information on the traveling status. For example, the processor 311 acquires a sensor value of the contact sensor 34 and acquires information on the contact status with surrounding obstacles. In addition, for example, the processor 311 acquires a motor load of an electric motor serving as the drive source 321 and a battery usage amount of the battery 33 as information on the traveling status of the traveling body 3. In addition, when the traveling body 3 includes an engine, the engine load may be acquired as information on the traveling status.

In S72, the processor 311 determines the usage fee according to the traveling status of the traveling body 3. For example, the processor 311 determines the usage fee such that the amount of payment necessary for using the vehicle 2 increases as the travel frequency or the travel load of the traveling body 3 increases. In addition, for example, the processor 311 determines the usage fee such that the amount of payment required for using the vehicle 2 increases as the contact frequency with obstacles increases or the impact at the time of contact increases.

For example, it is conceivable that the higher the travel frequency, the travel load, and the contact frequency with obstacles, or the greater the impact at the time of contact with an obstacle, the higher the necessary maintenance cost. According to the processing example, by determining the usage fee according to such a traveling status, the service provider can collect the cost from the user more effectively.

In addition, the control unit 41 may perform condition determination in S301 or the travel control unit 31 may perform condition determination in S211 on the basis of the usage fee determined in the processing of S72. That is, a configuration may be adopted in which the usage fee determined in the processing of S72 is compared with the amount of payment made by the user to determine whether to limit the driving of the traveling body 3.

SUMMARY OF EMBODIMENT

The above embodiments disclose at least the following traveling body, payment management system, and vehicle.
1. A traveling body (for example, 31) of the above embodiments is comprising:
   a reception unit (for example, 35) that receives first information regarding a state of payment related to use of the traveling body from a payment management server (for example, 5) that manages the state of payment;
   a traveling mechanism (for example, 35) that is driven under control of a control unit (for example, 41, S3) capable of limiting traveling of the traveling body according to the state of payment; and
   a transmission unit (for example, 35, 311, S2) that transmits second information based on the first information to the control unit.

According to this embodiment, since the information from the payment management server is received on the side of the traveling body, it is not necessary to provide a configuration capable of communicating with the payment management server on the side of the control unit. Therefore, it is possible to limit the driving of the traveling body according to the state of payment more easily.

2. According to the above embodiment, the traveling body wherein
   the traveling body is capable of traveling in a first traveling mode and traveling in a second traveling mode in which driving is more limited than in the first traveling mode, and
   when the first information does not satisfy a predetermined condition (for example, S212, S213) in a case where the traveling mode is the first traveling mode, the transmission unit transmits information requesting switching from the first traveling mode to the second traveling mode to the control unit as the second information (for example, S214).

According to this embodiment, when the first information does not satisfy a predetermined condition, it is possible to switch the traveling mode of the traveling body to a mode with a more limited function.

3. According to the above embodiment, the traveling body is further comprising:
   an acquisition unit (for example, 311, S71) capable of acquiring third information that is information on a traveling status of the traveling body; and
   a determination unit (for example, 311, S72) that determines a necessary amount of payment on the basis of the third information.

According to this embodiment, it is possible to determine a necessary amount of payment, that is, a usage fee of the vehicle according to the traveling status of the traveling body.

4. According to the above embodiment, the traveling body is wherein
   the traveling mechanism includes an engine (for example, 321), and
   the third information includes information on an engine load.

According to this embodiment, it is possible to determine the usage fee of the vehicle according to the engine load.

5. According to the above embodiment, the traveling body is wherein
   the traveling mechanism includes an electric motor (for example, 321),
   the traveling body further includes a battery (for example, 33) that supplies electric power to the electric motor, and
   the third information includes information on at least one of a motor load and a battery usage amount.

According to this embodiment, it is possible to determine the usage fee of the vehicle according to the motor load or the battery usage amount.

6. According to the above embodiment, the traveling body further comprises
   a detection unit (for example, 34) capable of detecting contact with an obstacle around the traveling body, wherein
   the third information includes information on a contact status with the obstacle.

According to this embodiment, it is possible to determine the usage fee of the vehicle 2 according to the contact status with obstacles around the traveling body.

7. A payment management system (for example, 1) of the above embodiments comprises,
   a traveling body (for example, 3); and
   a payment management server (for example, 5) that manages a state of payment related to use of the traveling body, wherein
   the traveling body includes:
   a reception unit (for example, 35) that receives first information regarding the state of payment from the payment management server;
   a traveling mechanism (for example, 32) that is driven under control of a control unit capable of limiting traveling of the traveling body according to the state of payment; and
   a transmission unit (for example, 34, 311, S2) that transmits second information based on the first information to the control unit.

According to this embodiment, since the information from the payment management server is received on the side of the traveling body, it is not necessary to provide a configuration capable of communicating with the payment management server on the side of the control unit. Therefore, it is possible to limit the driving of the traveling body according to the state of payment more easily.

8. A vehicle (for example, 2) of the above embodiments comprises
a traveling body (for example, 3); and
a control unit (for example, 41) capable of limiting traveling of the traveling body, wherein
the traveling body includes:
a reception unit (for example, 35) that receives first information regarding a state of payment related to use of the traveling body from a payment management server that manages the state of payment;
a traveling mechanism (for example, 32) that is driven under control of a control unit capable of limiting traveling of the traveling body according to the state of payment; and
a transmission unit (for example, 34, 311, S2) that transmits second information based on the first information to the control unit, and
the control unit limits traveling of the traveling body on the basis of the second information (for example, S3).

According to this embodiment, since the information from the payment management server is received on the side of the traveling body, it is not necessary to provide a configuration capable of communicating with the payment management server on the side of the control unit. Therefore, it is possible to limit the driving of the traveling body according to the state of payment more easily.

9. According to the above embodiment, the vehicle is wherein the control unit determines whether the second information satisfies a predetermined condition (for example, S301), and limits driving of the traveling body when determining that the second information does not satisfy the predetermined condition (for example, S302, S303).

According to this embodiment, it is possible to limit the driving of the traveling body by the control unit when the second information does not satisfy a predetermined condition.

10. According to the above embodiment, the vehicle is wherein the control unit limits driving of the traveling body by causing the vehicle to return to a predetermined position and stand by (for example, S303, S312).

According to this embodiment, it is possible to prevent the traveling vehicle from stopping on the spot.

11. According to the above embodiment, the vehicle is wherein
the traveling body includes an electric motor (for example, 321) and a battery (for example, 33) that supplies electric power to the electric motor, and
the predetermined position is a charging station (for example, 7) for charging the battery.

According to this embodiment, it is possible to charge the battery until the traveling limit is canceled.

12. According to the above embodiments, the vehicle further comprises
a work unit (for example, 42) mounted on the traveling body and controlled by the control unit, wherein
the control unit limits work by the work unit on the basis of the second information (for example, S4).

According to this embodiment, the control unit can limit work by the work unit according to the state of payment.

13. According to the above embodiments, the vehicle is wherein
the control unit stops work of the work unit when the vehicle returns to the predetermined position (for example, S4).

According to this embodiment, the control unit can stop work by the work unit in a situation where travel is limited.

The invention is not limited to the foregoing embodiments, and various variations/changes are possible within the spirit of the invention.

What is claimed is:

1. A traveling body comprising:
a reception unit that receives first information regarding a state of payment related to use of the traveling body from a payment management server that manages the state of payment;
a traveling mechanism that is driven under control of a control unit capable of limiting traveling of the traveling body according to the state of payment;
a transmission unit that transmits second information based on the first information to the control unit;
an acceleration sensor that detects contact with an obstacle around the traveling body; and
a determination unit that determines a usage fee for using the traveling body based on a detection result of the acceleration sensor.

2. The traveling body according to claim 1, wherein
the traveling body is capable of traveling in a first traveling mode and traveling in a second traveling mode in which driving is more limited than in the first traveling mode, and
when the first information does not satisfy a predetermined condition in a case where the traveling mode is the first traveling mode, the transmission unit transmits information requesting switching from the first traveling mode to the second traveling mode to the control unit as the second information.

3. The traveling body according to claim 1, wherein
the traveling mechanism includes an engine, and
the determination unit determines the usage fee based on the detection result and information on an engine load.

4. The traveling body according to claim 1, wherein
the traveling mechanism includes an electric motor,
the traveling body further includes a battery that supplies electric power to the electric motor, and
the determination unit determines the usage fee based on the detection result and information on at least one of a motor load and a battery usage amount.

5. The traveling body according to claim 1, wherein
the determination unit determines the usage fee so as to increase as a contact frequency with obstacles increases.

6. The traveling body according to claim 1, wherein
the determination unit determines the usage fee so as to increase as the impact increases.

7. A payment management system comprising:
a traveling body; and
a payment management server that manages a state of payment related to use of the traveling body, wherein
the traveling body includes:
a reception unit that receives first information regarding the state of payment from the payment management server;
a traveling mechanism that is driven under control of a control unit capable of limiting traveling of the traveling body according to the state of payment;
a transmission unit that transmits second information based on the first information to the control unit;
an acceleration sensor that detects contact with an obstacle around the traveling body; and
a determination unit that determines a usage fee for using the traveling body based on a detection result of the acceleration sensor.

8. A vehicle comprising:
a traveling body; and
a control unit capable of limiting traveling of the traveling body, wherein
the traveling body includes:
a reception unit that receives first information regarding a state of payment related to use of the traveling body from a payment management server that manages the state of payment;
a traveling mechanism that is driven under control of the control unit according to the state of payment;
a transmission unit that transmits second information based on the first information to the control unit;
an acceleration sensor that detects contact with an obstacle around the traveling body; and
a determination unit that determines a usage fee for using the traveling body based on a detection result of the acceleration sensor, and
the control unit limits traveling of the traveling body on the basis of the second information.

9. The vehicle according to claim 8, wherein the control unit determines whether the second information satisfies a predetermined condition, and limits driving of the traveling body when determining that the second information does not satisfy the predetermined condition.

10. The vehicle according to claim 9, wherein the control unit limits driving of the traveling body by causing the vehicle to return to a predetermined position and stand by.

11. The vehicle according to claim 10, wherein
the traveling body includes an electric motor and a battery that supplies electric power to the electric motor, and
the predetermined position is a charging station for charging the battery.

12. The vehicle according to claim 10 further comprising a work unit mounted on the traveling body and controlled by the control unit, wherein
the control unit limits work by the work unit on the basis of the second information.

13. The vehicle according to claim 12, wherein
the control unit stops work of the work unit when the vehicle returns to the predetermined position.

* * * * *